United States Patent Office 3,240,750
Patented Mar. 15, 1966

3,240,750
POLYPROPYLENE STABILIZED WITH MALEIC ACID MONO OR DIESTERS
Alberto Bonvicini, Terni, Italy, assignor to Montecatini Società Generale per l'Industria Mineraria e Chimica, Milan, Italy
No Drawing. Filed Dec. 18, 1961, Ser. No. 160,259
Claims priority, application Italy, Dec. 21, 1960, 21,921/60, Patent 642,042
10 Claims. (Cl. 260—45.85)

The present invention relates to stabilized crystalline polymeric compositions of poly-alpha olefins such as polypropylene, and to a process for stabilizing such crystalline olefin polymers.

It is known that polyolefin materials undergo a certain amount of degradation during hot working, particularly in the presence of atmospheric oxygen. It is also known that manufactured articles made from crystalline polyolefins are sensitive to the action of light and to thermal treatment.

This tendency toward degradation can be reduced by the addition of certain protective substances, i.e., stabilizers, to the polymer, desirably during the preparation of fibres, films, etc. from such polymer.

Typical stabilizers which have been used for this purpose include amines, aminophenols, chelates of transition metals, e.g. Ni, organotin compounds, triazo compounds, zinc compounds, dithiocarbamates, phenols, phosphites, mercaptans, oximes, polyquinolines, sulfur derivatives, silicones, thiophosphites and the like. These stabilizers are always used in relatively low proportions. I have now surprisingly found that mono- and di-esters of maleic acid, these esters being defined by the general formula

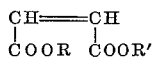

in which R is either an aliphatic akyl group containing from 3 to 30 carbon atoms and having straight or branched chain or a hydrogen atom, and wherein R' is an aliphatic alkyl group having from 3 to 30 carbon atoms and having a straight or branched chain, present a high stabilizing action against the action of heat and, in several instances against aging and light. Such ester stabilizers are mixed with the crystalline olefin polymer in an amount up to 2% by weight of such polymer plus stabilizer, which polymer is generally suitable for the production of fibres or films. These esters also act as stabilizers for compositions comprising a crystalline polyolefin and a basic nitrogen compound, such as those formed from polypropylene and polyalkyleneimine, as disclosed in U.S. patent application Serial No. 702,430, filed December 12, 1957, now U.S. Patent No. 3,107,228, which compositions can be used to produce fibres having improved tinctorial characteristics.

It will therefore be seen that the present invention results in the obtaining of polymeric compositions that are stable against the action of heat, aging and light, which compositions comprise (a) a crystalline polyolefin, e.g., polypropylene, and (b) a mono- or diester of maleic acid having the general formula

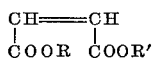

in which R and R' are as previously defined. The ester is present in an amount from about 0.02% to 2%, based on the weight of the polyolefin plus stabilizer, a more desirable range being from about 0.2% to 1%. A preferred amount for the ester is about 1%.

Particularly suitable esters include dibutylmaleate, dioctylmaleate, diisooctyl maleate and monolaurylmaleate.

The application of the stabilizing compounds of the invention may be carried out by mixing such compounds with the polyolefins while agitating. The stabilizers can also, of course, be added by other methods, e.g., by mixing the polyolefin with a solution of the stabilizer in a suitable solvent and then evaporating the solvent, or by adding the stabilizer to the polyolefin at the end of the polymerization reaction. It is also possible to obtain the stabilizing action by applying the stabilizing compounds directly onto the manufactured article, e.g., by immersing the article in a stabilizer solution or dispersion and then evaporating the solvent.

The stabilizing compounds of the present invention exhibit good compatibility with polyolefins in the molten state and have no staining action.

The stabilized compositions of the present invention are particularly suitable for preparing mono- and multi-filaments, staple, dyeable yarns, bulk yarns, films, tapes, shaped articles and the like.

The addition to the compositions of the present invention, before the spinning thereof, of an inorganic salt of stearic acid, e.g., calcium stearate, having the function of an anti-acid agent, improves the stability characteristics of the compositions.

The following examples will illustrate the present invention without limiting its scope. All parts are by weight unless otherwise stated. The polypropylene used in these examples was crystalline polypropylene consisting prevailingly of isotactic macromolecules as defined by Natta, e.g., in U.S. Patent 2,882,263.

EXAMPLE 1

In a Henschel type mixer, a homogeneous mixture was prepared at room temperature from polypropylene (prepared with the aid of stereospecific catalysts and having an intrinsic viscosity determined in tetrahydronaphthalene at 130° C of 1.34, an ash content of 0.028%, and a residue from heptane extraction of 93.4%) and dioctylmaleate. The amount of dioctylmaleate used was 0.5% based on the weight of polypropylene plus dioctylmaleate. The stabilizer-polymer mixture produced a clear molten mass when subjected to melting in a test tube maintained in a thermostatic bath at 250° C. for 10 minutes. The mix was spun in a melt-spinning device under the following conditions:

Screw temperature _____ 220° C.
Head temperature _____ 220° C.
Spinneret temperature _____ 220° C.
Spinneret type _____ 40 x 0.5 x 10 mm.
Maximum pressure _____ 60 kg./cm.²
Winding speed _____ 230 meters per minute.

The fibres were stretched at a temperature of 125° C. in steam with a stretching ratio of 1:5. The characteristics of the fibres obtained, were as follows:

Tenacity _____ grs./den__ 4.1
Elongation _____ percent___ 30

The characteristics of an unstabilized polymer control were:

Tenacity _____ grs./den__ 4.5
Elongation _____ percent___ 26

Upon transition of the stabilized polymer to a fibre, the intrinsic viscosity was lowered to 74% of its initial value, whereas the same transition of the unstabilized polymer control caused the viscosity to be lowered to 70% of the initial value.

The stabilized fibre was exposed to summer sunlight for 200 hours, whereupon its tenacity was lowered to 51% of the initial value. Similar treatment of the non-stabilized control resulted in a decrease in tenacity to 28% of the initial value.

EXAMPLES 2–4

The procedure and tests as described in Example 1 were repeated; however, the stabilizer was varied. The specific conditions and data obtained are reported in Table I.

*Table I*

| | Example 2 | Example 3 | Example 4 | Non-stabilized control |
|---|---|---|---|---|
| Polypropylene: | | | | |
| Intrinsic viscosity | 1.34 | 1.34 | 1.34 | 1.34 |
| Ash content, percent | 0.028 | 0.028 | 0.028 | 0.028 |
| Residue from heptane extraction, percent | 93.4 | 93.4 | 93.4 | 93.4 |
| Stabilizer | (¹) | (²) | (³) | |
| Stabilizer proportion, percent | 0.5 | 0.5 | 0.5 | |
| Color of the molten mix | Clear | Clear | Clear | Clear |
| Spinning conditions: | | | | |
| Screw temperature, °C | 220 | 210 | 210 | 220 |
| Head temperature, °C | 200 | 210 | 210 | 210 |
| Spinneret temperature, °C | 210 | 220 | 230 | 230 |
| Spinneret type | (⁴) | (⁴) | (⁴) | (⁴) |
| Maximum pressure (kg./cm.) | 60 | 70 | 60 | 60 |
| Winding speed (m./minute) | 230 | 220 | 230 | 230 |
| Stretching conditions: | | | | |
| Temperature, °C | 130 | 120 | 130 | 130 |
| Medium | Steam | Steam | Steam | Steam |
| Stretching ratio | 1:5 | 1:5 | 1:5 | 1:5 |
| Serimetric characteristics of the stretched yarn: | | | | |
| Tenacity, g./den | 4 | 4.9 | 3.8 | 4.5 |
| Elongation, percent | 20 | 25 | 27 | 26 |
| Thermal degradation (percent decrease of the intrinsic viscosity by extrusion) | 74 | 77 | 81 | 70 |
| Ultra-violet degradation (residual tenacity after exposure to a mercury lamp for 10 hours) | 60 | 37 | 38 | 32 |
| Sunlight degradation (residual tenacity after exposure to summer sunlight for 200 hours) | | | | 28 |

¹ Diisooctyl maleate.
² Dibutyl maleate.
³ Monolauryl maleate.
⁴ 40 x 0.5 x 10 mm.

Variations can, of course, be made without departing from the spirit of the invention.

Having thus described the invention, what is claimed is:

1. A polymeric composition that is stable against the action of heat, aging and light, this composition comprising polypropylene and a stabilizing amount of a stabilizer consisting of a maleic acid ester of the formula $$\begin{array}{c} \mathrm{CH}\!=\!\mathrm{CH} \\ | \quad\; | \\ \mathrm{COOR}\;\;\mathrm{COOR'} \end{array}$$

wherein R is selected from the group consisting of hydrogen and an aliphatic alkyl radical having from 3 to 30 carbon atoms, and wherein R' is an aliphatic alkyl radical having from 3 to 30 carbon atoms.

2. The polymeric composition of claim 1, wherein the polypropylene is crystalline polypropylene consisting prevailingly of isotactic macromolecules.

3. The polymeric composition of claim 1, wherein the stabilizer is dibutyl maleate.

4. The polymeric composition of claim 1, wherein the stabilizer is dioctyl maleate.

5. The polymeric composition of claim 1, wherein the stabilizer is diisooctyl maleate.

6. The polymeric composition of claim 1, wherein the stabilizer is monolauryl maleate.

7. The polymeric composition of claim 1 in filamentary form.

8. The polymeric composition of claim 1 in film form.

9. The polymeric composition of claim 1, wherein the amount of stabilizer is from about 0.02% to 2% based on the total weight of the polypropylene plus stabilizer.

10. The polymeric composition of claim 9, wherein the amount of stabilizer is from about 0.2% to 1%.

References Cited by the Examiner

UNITED STATES PATENTS

| 2,313,757 | 3/1943 | Matheson et al. | 260—45.85 |
| 2,457,035 | 12/1948 | Darby | 260—45.85 |
| 2,617,784 | 11/1952 | Slocombe et al. | 260—45.85 |
| 2,839,492 | 6/1958 | Caldwell et al. | 260—45.85 |
| 2,985,617 | 5/1961 | Salyer et al. | 260—45.85 |

OTHER REFERENCES

Mark, Scientific American, September 1957, vol. 197, No. 3, pp. 81–89.

Karpov. V. L. et al.: Trudy 2-go (Vtorgo) Vses. Soveshch. Po Radiata. Khim., Akad. Nuak. SSSR, Otd., Khim. Nauk. Moscow, 1960, pp. 547–53. Note: Abstracted in Chemical Abstracts, April 1963, col. 6977(h).

LEON J. BERCOVITZ, *Primary Examiner.*

JOSEPH R. LIBEMAN, *Examiner.*